US008584493B2

(12) United States Patent
Gorontzi et al.

(10) Patent No.: US 8,584,493 B2
(45) Date of Patent: Nov. 19, 2013

(54) ACTUATING LEVER WHICH CAN BE PIVOTED INTO A RECESS

(75) Inventors: Armin Gorontzi, Herdecke (DE); Peter Höschler, Velbert (DE); Friedrich Rinke, Hemer-Ihmert (DE)

(73) Assignee: DIRAK Dieter Ramsauer Konstruktionselemente GmbH, Ennepetal (DE)

( * ) Notice: Subject to any disclaimer, the term of this patent is extended or adjusted under 35 U.S.C. 154(b) by 0 days.

(21) Appl. No.: 13/696,273

(22) PCT Filed: Apr. 29, 2011

(86) PCT No.: PCT/EP2011/002139
§ 371 (c)(1), (2), (4) Date: Dec. 5, 2012

(87) PCT Pub. No.: WO2011/137991
PCT Pub. Date: Nov. 10, 2011

(65) Prior Publication Data

US 2013/0098123 A1 Apr. 25, 2013

(30) Foreign Application Priority Data

May 7, 2010 (DE) ..................... 20 2010 006 525 U

(51) Int. Cl.
*B60R 25/02* (2013.01)

(52) U.S. Cl.
USPC .................................. 70/208; 70/423; 70/455

(58) Field of Classification Search
USPC ........................ 70/208, 423, 424, 455, 456 R
See application file for complete search history.

(56) References Cited

U.S. PATENT DOCUMENTS

| | | | | | |
|---|---|---|---|---|---|
| 1,439,038 | A | * | 12/1922 | Teich | 70/455 |
| 1,586,904 | A | * | 6/1926 | Kuhn | 411/350 |
| 2,105,763 | A | * | 1/1938 | De Berry | 70/456 R |
| 2,247,592 | A | * | 7/1941 | Swift | 70/455 |
| 2,439,978 | A | * | 4/1948 | Konchan | 70/455 |
| 2,566,493 | A | * | 9/1951 | Ladd | 30/162 |
| 2,702,468 | A | * | 2/1955 | Spain | 70/455 |
| 2,931,210 | A | * | 4/1960 | Agee, Jr. | 70/456 R |
| 3,270,539 | A | * | 9/1966 | Hirsch | 70/414 |
| 3,427,834 | A | * | 2/1969 | Tutino | 70/414 |

(Continued)

FOREIGN PATENT DOCUMENTS

EP 1 063 370 12/2000

OTHER PUBLICATIONS 2010 main catalog of DIRAK Dieter Ramsauer Konstruktionselemente GmbH; p. 3-151; published Dec. 2009; Ennepetal, Germany.

*Primary Examiner* — Suzanne Barrett
(74) *Attorney, Agent, or Firm* — Frommer Lawrence & Haug LLP

(57) ABSTRACT

The invention describes an actuating lever which can be pivoted into a recess, and which, in the pivoted-in position, can be locked in place by means of a key-actuable lock, such as a cylinder lock, wherein the access opening for the key is provided with a cover, secured by means of a pin, wherein according to the invention the cover can be moved along the longitudinal extension of the actuating lever between two end positions, with said cover closing off the access opening in one end position and exposing the access opening in the other end position, and wherein the cover forms an undercut groove, which receives the head of a pin which is secured to the actuating lever.

9 Claims, 2 Drawing Sheets

(56) References Cited

U.S. PATENT DOCUMENTS

| | | | | | |
|---|---|---|---|---|---|
| 3,605,464 | A | * | 9/1971 | Ostrager | 70/414 |
| 3,613,414 | A | * | 10/1971 | Ostrager | 70/294 |
| 3,672,192 | A | * | 6/1972 | Dontas | 70/414 |
| 3,680,338 | A | * | 8/1972 | Lee | 70/456 R |
| 5,893,282 | A | * | 4/1999 | Runge et al. | 70/208 |
| 6,240,755 | B1 | * | 6/2001 | Da Silva | 70/423 |
| 7,401,484 | B1 | * | 7/2008 | Holmes et al. | 70/423 |
| 7,526,936 | B2 | * | 5/2009 | Niskanen et al. | 70/423 |
| 7,610,784 | B2 | * | 11/2009 | Rohde et al. | 70/455 |
| 8,176,758 | B2 | * | 5/2012 | Ramsauer et al. | 70/208 |
| 8,291,732 | B2 | * | 10/2012 | Ramsauer et al. | 70/208 |
| 2008/0190157 | A1 | * | 8/2008 | Mizuno | 70/455 |

* cited by examiner

Fig. 1A
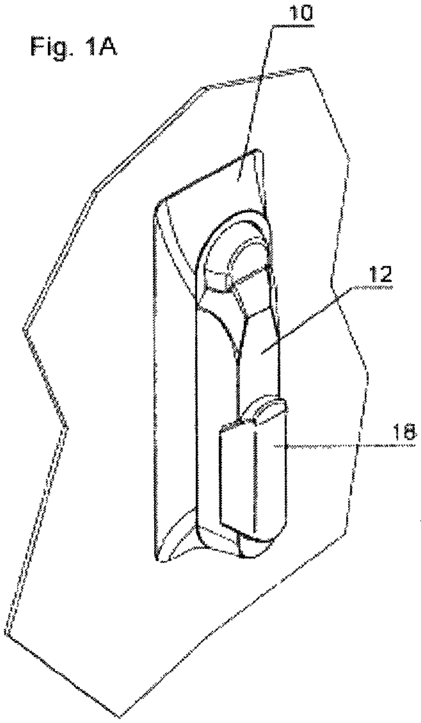
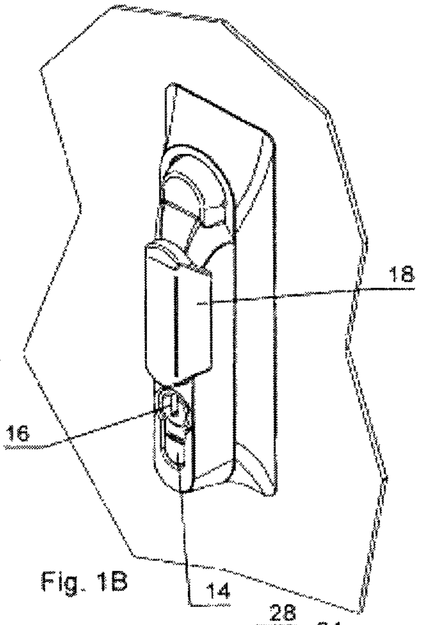
Fig. 1B
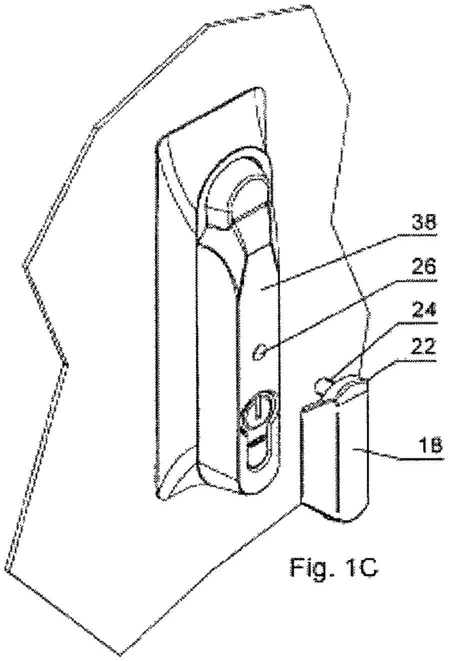
Fig. 1C
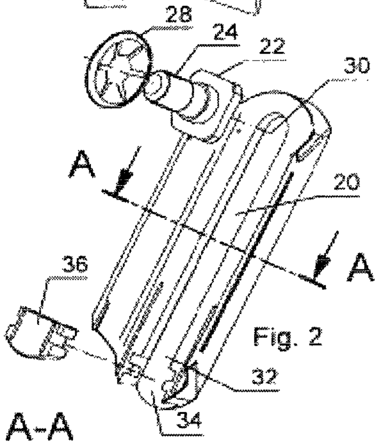
Fig. 2
A-A
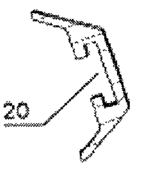
Fig. 3

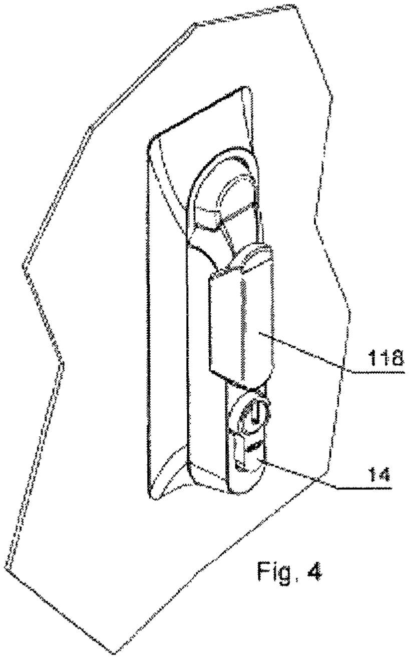
Fig. 4
Fig. 5
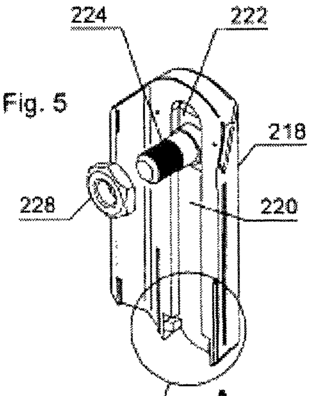
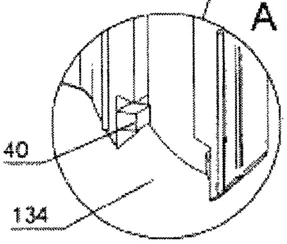
Fig. 6
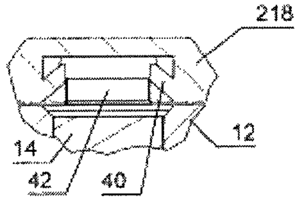
Fig. 7
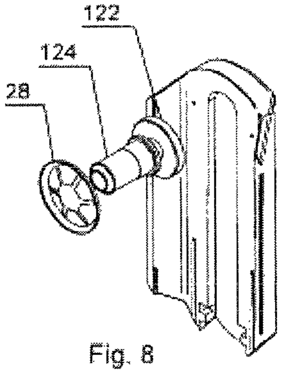
Fig. 8
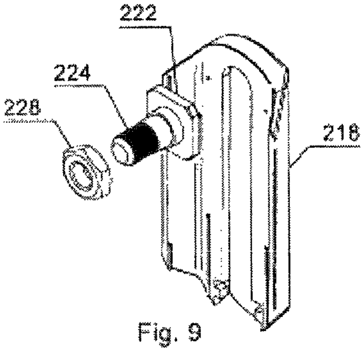
Fig. 9

ACTUATING LEVER WHICH CAN BE PIVOTED INTO A RECESS

The present application claims priority from PCT Patent Application No. PCT/EP2011/002139 filed on Apr. 29, 2011, which claims priority from German Patent Application No. DE 20 2010 006 525.9 filed on May 7, 2010, the disclosures of which are incorporated herein by reference in their entirety.

FIELD OF THE INVENTION

The invention relates to an actuating lever which can be pivoted into a recess, and which, in its pivoted-in position, can be locked in place by means of a key-actuable lock, such as a cylinder lock, wherein the access opening for the key is provided with a cover, which is secured by means of a pin.

It is noted that citation or identification of any document in this application is not an admission that such document is available as prior art to the present invention.

An actuating lever of this type is already known from catalog page 3-151 of the 2010 main catalog of DIRAK Dieter Ramsauer Konstruktionseletnente GmbH. Reference is also made to EP 1 063 370 A1. The aforementioned cover can be easily broken off (vandalism), especially once it has been pivoted to one side to expose the cylinder.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

The problem addressed by the invention is that of devising further embodiments of the known actuating lever in which the cover can be easily replaced.

The problem is solved in that the cover can be moved along the longitudinal extension of the actuating lever between two end positions, wherein in one end position the cover closes off the access opening and in the other end position the cover exposes the access opening, and in that the cover forms an undercut groove, which receives the head of a pin, which is secured to the actuating lever.

According to a further development of the invention, the pin is secured by means of a spring washer.

According to another embodiment, the pin is secured by means of a screw nut.

According to a further embodiment, the pin can have a round head; however, it can also have a prismatic head, for example, a rectangular or square head.

The undercut groove can be closed off at one end, while at the other end it forms an insertion opening for the pin head, with the pin being prevented by means of a latching device from filling out once the pin head has been inserted.

The latching device can be formed by press-fit projections.

Alternatively, the latching device can be formed by a molded article.

The cross-section of the cover can encompass the cross-section of the actuating lever in a U- or V-shape.

In what follows, the invention will be specified in greater detail within the context of embodiment examples, which are illustrated in the set of drawings.

BRIEF DESCRIPTION OF THE DRAWINGS

FIG. 1A shows a perspective plan view of a first embodiment of the actuating lever according to the invention, mounted on a thin panel, such as a sheet panel, with the cover shown in the dosed position;

FIG. 1B shows the actuating lever of FIG. 1A, in which the cover is shown in the open position;

FIG. 1C shows a view similar to that of FIG. 1A, but with the cover removed;

FIG. 2 shows an alternative illustration of the cover in the removed state, from the back;

FIG. 3 shows a sectional view along line of cut A-A of FIG. 2;

FIG. 4 shows a perspective, plan view of an actuating lever, in which the cylinder lock projects outward;

FIG. 5 shows the back of the corresponding cover;

FIG. 6 shows an enlarged illustration of the end region of the cover illustrating the locking projections;

FIG. 7 shows a transverse sectional view of the lever with the cover pushed on;

FIG. 8 shows an embodiment with a round headed pin and a spring washer; and

FIG. 9 shows an embodiment with a rectangular headed pin and a screw nut.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIG. 1A shows a perspective plan view of an actuating lever 12 which can be pivoted into a recess 10, and which in its pivoted-in position, shown in FIGS. 1A and 1B, can be locked in place by means of a key-actuable lock 14, for example, a cylinder lock, wherein the access opening 16 for the key is provided with a movable cover 18 that can be moved along the longitudinal extension of the actuating lever 12 between two end positions, shown in FIG. 1A and FIG. 1B, which in the one end position, see FIG. 1A, closes off the access opening 16 and in the other end position exposes the access opening 16, see FIG. 1B.

In EP 1 063 370 A1, the actuating lever is specially shaped to enable a slide mounting of the cover. In the subject matter of said invention, in contrast, the actuating lever is merely equipped with a bore hole, in which, according to the prior art, the cited catalog page, a cover part that can be pivoted outward can be rotatably mounted, which, in its pivoted-out state, can easily break off.

However, an actuating lever of this type with a bore hole can also serve to receive a cover embodied according to the invention, which is characterized, for example, in that the cover forms an undercut groove, identified by reference sign 20, in which groove the head 22 of a pin 24 is received and can be fixed on the actuating lever.

The shaft of the pin 24 is inserted through a (the) bore hole 26 in the actuating lever 12, and is secured by means of a spring washer 28. Rather than a spring washer 28, as shown in FIG. 8, a nut 228, as shown in FIG. 9, can also be used to secure the pin 224 on the actuating lever 12.

The pin 124 can have a round head, as shown in FIG. 8, reference sign 122, or the pin 24, 224 can have a prismatic head, for example, a rectangular or square head, see reference signs 22, 222.

The undercut groove 20 is expediently closed off at one end 30, and at the other end 32, an insertion opening 34 for the pin head 22 is formed, with the pin 24 being prevented by means of a latching device 36 from falling out once the pin head 22 has been inserted into the groove 20.

According to FIG. 2, the latching device 36 is formed by a molded article, which can be received in corresponding openings in the cover 18. Alternatively, projections 40 can be provided, which are press-fit into the groove 220.

The cover 18 according to FIGS. 1A, 1B, 1C, 2 and 3 has a cross-section according to FIG. 3 which is U- or V-shaped, and which encompasses the actuating lever 12 in a form-fitting manner.

In the embodiment according to FIGS. 1A, 1B, 1C, 2 and 3, the cylinder 14 is arranged such that it does not project beyond the plane 38 of the actuating lever head. In the embodiment according to FIGS. 4 and 5, in contrast, the cylinder 14 projects beyond this plane, making it necessary for the groove to be deeper in order to accommodate the projecting head of the cylinder 14. For this purpose, it would be necessary to exchange the cover, which can be accomplished easily by removing the spring washer or screw nut 28, 228.

The additional space for the projecting cylinder 14 is acquired in FIG. 7 by the space 42, which is provided above the cover 218 that lies on the actuating lever 12.

With the correspondingly easy accessibility to the cover 18 and the vertical arrangement of the lever 12, the cover 18 will slide automatically into the cover position shown in FIG. 1A by virtue of its own weight.

INDUSTRIAL APPLICABILITY

The invention is industrially applicable in the field of equipment cabinet construction.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE SIGNS

10 Recess
12 Actuating lever
14 Key-actuable lock
16 Access opening
18, 118, 218 Cover
20, 220 Undercut groove
22, 122, 222 Head of a pin
24, 124, 224 Pin
26 Bore hole
28, 228 Spring washer
30 End, closed
32 End, open
34, 134, 234 Insertion opening
36 Latching device, molded article
38 Head plane
40 Projections
42 Space

The invention claimed is:

1. An actuating lever configured to be pivoted into a recess, comprising:

a key-actuable lock which comprises an access opening for a key, where the key actuable lock is configured to lock the actuating lever in place when the actuating lever is in the pivoted-in position;

wherein the access opening for the key is provided with a cover which is secured by means of a pin;

wherein the cover is configured to be moved along a longitudinal extension of the actuating lever between two end positions;

wherein, in one end position, the cover closes off the access;

wherein, in the other end position, the cover exposes the access opening; and wherein the cover forms an undercut groove which receives the head of the pin which is secured to the actuating lever;

wherein the pin is secured by means of a spring washer.

2. An actuating lever configured to be pivoted into a recess, comprising:

a key-actuable lock which comprises an access opening for a key, where the key actuable lock is configured to lock the actuating lever in place when the actuating lever is in the pivoted-in position;

wherein the access opening for the key is provided with a cover which is secured by means of a pin;

wherein the cover is configured to be moved along a longitudinal extension of the actuating lever between two end positions;

wherein, in one end position, the cover closes off the access;

wherein, in the other end position, the cover exposes the access opening; and wherein the cover forms an undercut groove which receives the head of the pin which is secured to the actuating lever wherein the pin is secured by means of a screw nut.

3. The actuating lever according to claim 1;

wherein the pin has around head.

4. An actuating lever configured to be pivoted into a recess, comprising:

a key-actuable lock which comprises an access opening for a key, where the key actuable lock is configured to lock the actuating lever place when the actuating lever is in the pivoted-in position;

wherein the access opening for the key is provided with a cover which is secured by means of a pin;

wherein the cover is configured to be moved along a longitudinal extension of the actuating lever between two end positions;

wherein, in one end position, the cover closes off the access;

wherein, in the other end position, the cover exposes the access opening; and wherein the cover forms an undercut groove which receives the head of the pin which is secured to the actuating lever;

wherein the pin has a prismatic head.

5. An actuating lever configured to be pivoted into a recess, comprising:

a key-actuable lock which comprises an access opening for a key, where the key actuable lock is configured to lock the actuating lever in place when the actuating lever is in the pivoted-in position;

wherein the access opening for the key is provided with a cover which is secured by means of a pin;

wherein the cover is configured to be moved along a longitudinal extension of the actuating lever between two end positions;

wherein, in one end position, the cover closes off the access;

wherein, in the other end position, the cover exposes the access opening; and wherein the cover forms an undercut groove which receives the head of the pin which is secured to the actuating lever;

wherein the undercut groove is closed off at one end and at the other end forms an insertion opening for the pin head, with the pin being prevented, by means of a latching device, from falling out once the pin head has been inserted into the groove.

6. An actuating lever configured to be pivoted into a recess, comprising:

a key-actuable lock which comprises an access opening for a key, where the key actuable lock is configured to lock the actuating lever in place when the actuating lever is in the pivoted-in position;

wherein the access opening for the key is provided with a cover which is secured by means of a pin;

wherein the cover is configured to be moved along a longitudinal extension of the actuating lever between two end positions;

wherein, in one end position, the cover closes off the access;

wherein, in the other end position, the cover exposes the access opening; and wherein the cover forms an undercut groove which receives the head of the pin which is secured to the actuating lever;

wherein the undercut groove is closed off at one end and at the other end forms an insertion opening for the pin head, with the pin being prevented, by means of a latching device, from falling out once the pin head has been inserted into the groove wherein the latching device is formed by projections that are configured to be press-fit.

7. An actuating lever configured to be pivoted into a recess, comprising:

a key-actuable lock which comprises an access opening for a key, where the key actuable lock is configured to lock the actuating lever in place when the actuating lever is in the pivoted-in position;

wherein the access opening for the key is provided with a cover which is secured by means of a pin;

wherein the cover is configured to be moved along a longitudinal extension of the actuating lever between two end positions;

wherein, in one end position, the cover closes off the access;

wherein, in the other end position, the cover exposes the access opening; and wherein the cover forms an undercut groove which receives the head of the pin which is secured to the actuating lever;

wherein the undercut groove is closed off at one end and at the other end forms an insertion opening for the pin head, with the pin being prevented, by means of a latching device, from falling out once the pin head has been inserted into the groove;

wherein the latching devices are formed by a molded article.

8. The actuating lever according to claim 1;

wherein a cross-section of the cover encompasses a cross-section of the actuating lever in a U- or a V-shape.

9. The actuating lever according to claim 1;

wherein the groove provides space for a projecting cylinder above the plane of the actuating lever.

* * * * *